US011441978B1

(12) United States Patent
Wiederin et al.

(10) Patent No.: US 11,441,978 B1
(45) Date of Patent: Sep. 13, 2022

(54) AUTOMATIC EVAPORATIVE SAMPLE PREPARATION

(71) Applicant: Elemental Scientific, Inc., Omaha, NE (US)

(72) Inventors: Daniel R. Wiederin, Omaha, NE (US); Austin Schultz, Omaha, NE (US); Beau A. Marth, La Vista, NE (US); Mason Spilinek, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 705 days.

(21) Appl. No.: 16/381,545

(22) Filed: Apr. 11, 2019

Related U.S. Application Data

(60) Provisional application No. 62/656,666, filed on Apr. 12, 2018.

(51) Int. Cl.
*G01N 1/40* (2006.01)
*H01J 49/10* (2006.01)
(Continued)

(52) U.S. Cl.
CPC ............ *G01N 1/4022* (2013.01); *G01N 1/22* (2013.01); *G01N 1/2214* (2013.01);
(Continued)

(58) Field of Classification Search
CPC ...... G01N 1/4022; G01N 21/73; G01N 21/85; G01N 1/24; G01N 1/2258; G01N 1/22; G01N 1/2214; G01N 1/40; H01J 49/105
(Continued)

(56) References Cited

U.S. PATENT DOCUMENTS 3,508,582 A * 4/1970 Aulisa .................... F16L 39/04
137/625.11
3,868,970 A * 3/1975 Ayers .................... F16K 11/074
137/625.46
(Continued)

FOREIGN PATENT DOCUMENTS

EP        707209 A2 *  7/1995  ............ G01N 30/30
KR  10-1998-0039942   *  6/1999  ............ H01J 37/252
KR      10-1120944    *  2/2012  ............ G01N 30/20

OTHER PUBLICATIONS

Robert Thomas, A Beginner's Guide to ICP-MS, Spectroscopy, www.spectroscopyonline.com, Apr. 2001,75 pgs (Year: 2001).*
(Continued)

*Primary Examiner* — Clayton E. La Balle
*Assistant Examiner* — Kevin C Butler
(74) *Attorney, Agent, or Firm* — Kevin E. West; Advent, LLP

(57) ABSTRACT

Systems and methods for automatic preparation of samples through evaporative sampling for subsequent analysis are described. A system embodiment includes, but is not limited to, a sample source configured to supply a sample; an evaporation container fluidically coupled with the sample source to receive the sample; a temperature control element operably coupled with the evaporation container to vaporize a liquid portion of the sample within the evaporation container, the evaporation container fluidically coupled with a gas input to receive a gas to transport vapor from the evaporation container; and a cooling system configured to receive the vapor from the evaporation container and to condense the vapor for collection.

19 Claims, 15 Drawing Sheets

(51) Int. Cl.
   *G01N 21/73*   (2006.01)
   *G01N 21/85*   (2006.01)
   *G01N 1/22*    (2006.01)
   *G01N 1/24*    (2006.01)
(52) U.S. Cl.
   CPC ............. *G01N 1/2258* (2013.01); *G01N 1/24* (2013.01); *G01N 1/40* (2013.01); *G01N 21/73* (2013.01); *G01N 21/85* (2013.01); *H01J 49/105* (2013.01)
(58) Field of Classification Search
   USPC .................................................... 73/863.12
   See application file for complete search history.

(56) References Cited

U.S. PATENT DOCUMENTS

| | | | | |
|---|---|---|---|---|
| 4,204,430 A * | 5/1980 | Tamm | G01N 35/1095 | 73/1.02 |
| 4,552,178 A * | 11/1985 | Olsson | F16J 15/40 | 137/269 |
| 4,625,569 A * | 12/1986 | Toei | G01N 35/1097 | 73/863.72 |
| 5,105,851 A * | 4/1992 | Fogelman | F16K 11/083 | 137/625.11 |
| H1093 H * | 8/1992 | Huston | 422/62 | |
| 5,803,117 A * | 9/1998 | Olsen | F16K 11/0743 | 137/625.11 |
| 6,012,487 A * | 1/2000 | Hauck | F16K 11/0743 | 137/625.11 |
| 6,237,396 B1 * | 5/2001 | Durand | G01N 30/468 | 73/23.35 |
| 6,502,448 B1 * | 1/2003 | Rapkin | G01N 30/62 | 210/198.2 |
| 6,672,336 B2 * | 1/2004 | Nichols | F16K 11/074 | 137/625.11 |
| 7,986,399 B2 * | 7/2011 | Stark | G01N 1/4077 | 356/36 |
| 8,047,060 B2 * | 11/2011 | Dourdeville | G01N 30/22 | 73/61.56 |
| 8,322,197 B2 * | 12/2012 | Koster | G01N 30/20 | 73/61.55 |
| 8,343,774 B2 * | 1/2013 | Cormier | G01N 35/1097 | 436/180 |
| 8,438,939 B1 * | 5/2013 | Wiederin | G01N 1/22 | 73/864.22 |
| 8,545,773 B2 * | 10/2013 | Su | G01N 35/1097 | 422/537 |
| 8,650,936 B2 * | 2/2014 | Lee | G01N 30/38 | 73/61.56 |
| 8,944,102 B1 * | 2/2015 | Wiederin | F16K 11/0743 | 137/625.46 |
| 9,146,182 B1 * | 9/2015 | Wiederin | G01N 30/20 | |
| 9,177,772 B1 * | 11/2015 | Wiederin | H01J 49/045 | |
| 9,228,982 B2 * | 1/2016 | Ebsen | G01N 30/20 | |
| 9,435,771 B2 * | 9/2016 | Lee | G01N 30/20 | |
| 9,541,207 B1 * | 1/2017 | Saetveit | F16K 11/0853 | |
| 9,752,691 B1 * | 9/2017 | Saetveit | H01J 49/0495 | |
| 9,868,120 B2 * | 1/2018 | Boehm | B01L 3/50273 | |
| 10,024,801 B2 * | 7/2018 | Kawabata | G01N 21/85 | |
| 10,060,541 B1 * | 8/2018 | Saetveit | F16K 11/10 | |
| 10,192,726 B1 * | 1/2019 | Wiederin | G01N 1/38 | |
| 10,371,671 B2 * | 8/2019 | Ortmann | G01N 30/04 | |
| 10,379,088 B2 * | 8/2019 | Cormier | G01N 30/20 | |
| 10,379,132 B1 * | 8/2019 | Wiederin | G01N 1/405 | |
| 10,487,954 B2 * | 11/2019 | Killip | G01N 30/38 | |
| 10,500,583 B2 * | 12/2019 | Wiederin | G01N 35/1097 | |
| 10,549,281 B2 * | 2/2020 | Buermann | C12Q 1/6874 | |
| 10,746,708 B2 * | 8/2020 | Olovsson | G01N 30/20 | |
| 10,751,763 B2 * | 8/2020 | Marencik | B08B 5/00 | |
| 10,935,473 B2 * | 3/2021 | Wiederin | G01N 35/1097 | |
| 10,948,463 B2 * | 3/2021 | Hollnagel | G01N 30/24 | |
| 2002/0011437 A1 * | 1/2002 | Kaito | G01N 30/34 | 210/198.2 |
| 2004/0262513 A1 * | 12/2004 | Karol | H01J 49/0418 | 250/288 |
| 2005/0022743 A1 * | 2/2005 | Sakata | C23C 14/568 | 118/726 |
| 2006/0054543 A1 * | 3/2006 | Petro | G01N 30/20 | 210/198.2 |
| 2008/0210384 A1 * | 9/2008 | Guthrie | B01D 1/222 | 159/6.1 |
| 2009/0217735 A1 * | 9/2009 | Villen Altamirano | G01N 30/12 | 73/23.42 |
| 2010/0000943 A1 * | 1/2010 | Carson | B01D 1/0094 | 210/638 |
| 2012/0145617 A1 * | 6/2012 | Lee | B01D 15/16 | 210/198.2 |
| 2012/0305464 A1 * | 12/2012 | Cormier | G01N 35/1097 | 210/198.2 |
| 2013/0014568 A1 * | 1/2013 | Lee | G01N 30/465 | 73/61.56 |
| 2013/0067997 A1 * | 3/2013 | Ebsen | G01N 30/20 | 73/61.55 |
| 2013/0276520 A1 * | 10/2013 | Moeller | F16K 11/0743 | 73/61.56 |
| 2014/0007600 A1 * | 1/2014 | Johnson | F28D 1/05391 | 62/89 |
| 2015/0047730 A1 * | 2/2015 | Dourdeville | F16K 11/0853 | 137/625.47 |
| 2016/0334031 A1 * | 11/2016 | Shoykhet | B01D 15/10 | |
| 2017/0276342 A1 * | 9/2017 | Chen | B01D 1/30 | |
| 2017/0336369 A1 * | 11/2017 | Cormier | G01N 30/20 | |
| 2017/0343518 A1 * | 11/2017 | Thielsch | G01N 30/32 | |
| 2017/0343520 A1 * | 11/2017 | Ortmann | G01N 30/04 | |
| 2018/0052141 A1 * | 2/2018 | Stoll | G01N 30/34 | |
| 2018/0088091 A1 * | 3/2018 | Cormier | G01N 30/24 | |
| 2018/0127272 A1 * | 5/2018 | Shimizu | B01D 53/28 | |
| 2019/0070601 A1 * | 3/2019 | Wiederin | H01J 49/0431 | |
| 2019/0072464 A1 * | 3/2019 | Wiederin | G01N 1/405 | |
| 2021/0055191 A1 * | 2/2021 | Komarek | G01N 1/38 | |

OTHER PUBLICATIONS

J.R. Garbarino et al., Inductively COupled Plasma-Mass Spectrometeric Method for the Determination of dissolved Trace Elements in Natural Water, 1996, 55 pgs (Year: 1996).*
Written Opinion of the International Searching Authority, PCT/US2019/045938, dated Aug. 10, 2018, 6 pgs (Year: 2018).*
International Search Report (ISR), PCT/US2019/045938, dated Aug. 10, 2018, 3 pgs (Year: 2018).*

* cited by examiner

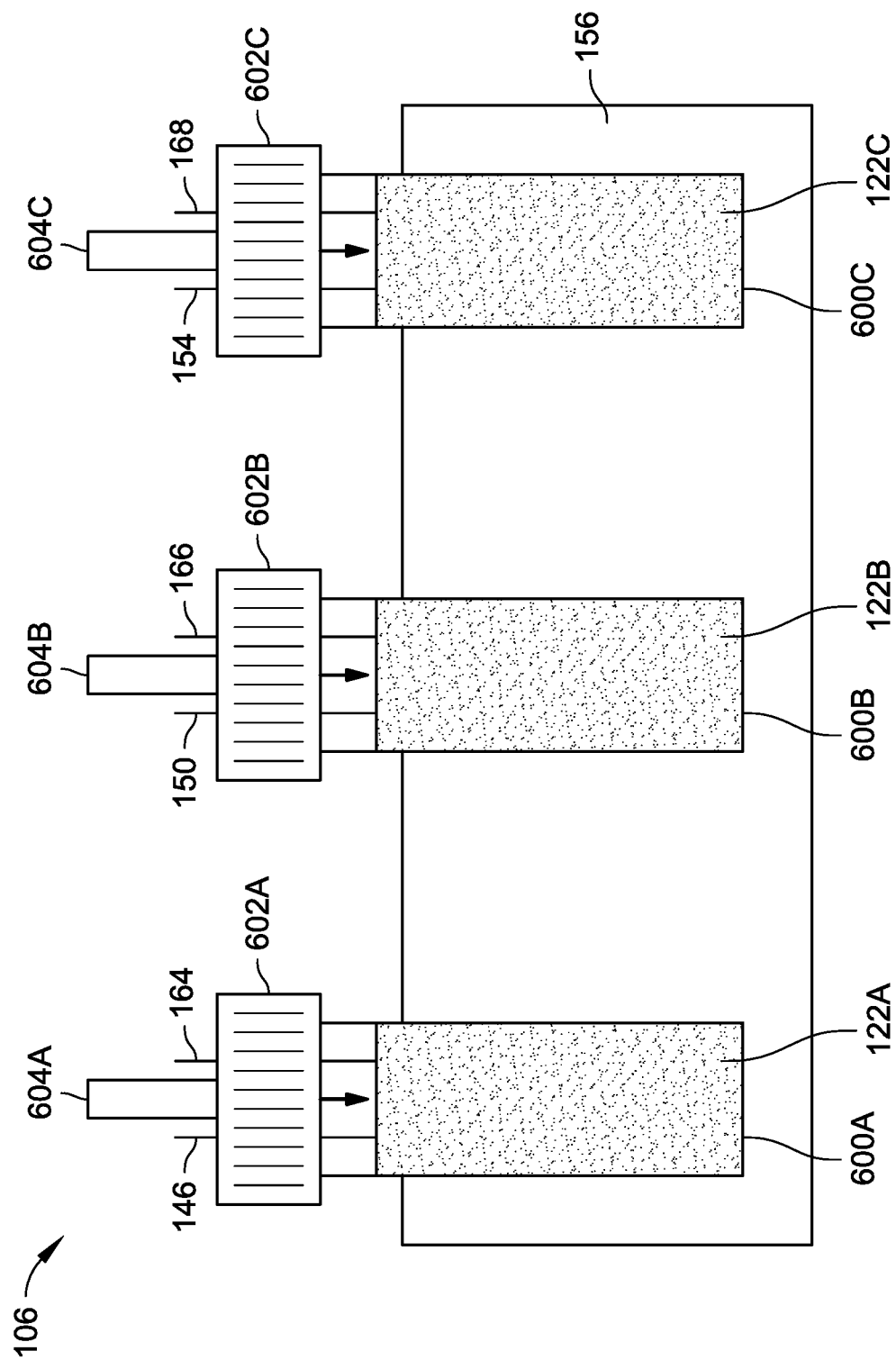

AUTOMATIC EVAPORATIVE SAMPLE PREPARATION

CROSS-REFERENCE TO RELATED APPLICATIONS

The present application claims the benefit of 35 U.S.C. § 119(e) of U.S. Provisional Application Ser. No. 62/656,666, filed Apr. 12, 2018, and titled "AUTOMATIC EVAPORATIVE SAMPLE PREPARATION." U.S. Provisional Application Ser. No. 62/656,666 is herein incorporated by reference in its entirety.

BACKGROUND

Spectrometry refers to the measurement of radiation intensity as a function of wavelength to identify component parts of materials. Inductively Coupled Plasma (ICP) spectrometry is an analysis technique commonly used for the determination of trace element concentrations and isotope ratios in liquid samples. For example, in the semiconductor industry, ICP spectrometry can be used to determine metal concentrations in samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample. The sample to be analyzed is often provided in a sample mixture.

Sample introduction systems may be employed to introduce liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Systems and methods for automatic preparation of samples through evaporative sampling for subsequent analysis are described. A system embodiment includes, but is not limited to, a sample input portion configured to receive a fluid sample from a sample source, the sample input portion including a sample loop to hold the fluid sample; an evaporation container fluidically coupled with the sample loop and a valve, the evaporation container including a fluid input line and a vapor output line and a body fluidically coupled to each of the fluid input line and the vapor output line, the evaporation container configured to receive the fluid sample into the body through the fluid input line when the valve is in a first valve configuration; a temperature control element operably coupled with the evaporation container to control a temperature of the body of the evaporation container to vaporize at least a portion of the fluid sample, the evaporation container fluidically coupled with a gas input when the valve is in a second valve configuration to receive a gas from the gas input through the fluid input line to transport vapor out of the evaporation container via the vapor output line; and a cooling system fluidically coupled with the vapor output line, the cooling system including at least one cooling element configured to receive the vapor from the evaporation container and to condense the vapor into liquid.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. In the figures, the use of the same reference numbers in different instances in the description and the figures may indicate similar or identical items.

FIG. 8 is a schematic illustrative of a plurality of evaporation containers in accordance with example implementations of the present disclosure.

DETAILED DESCRIPTION

Overview

Figure 1A:
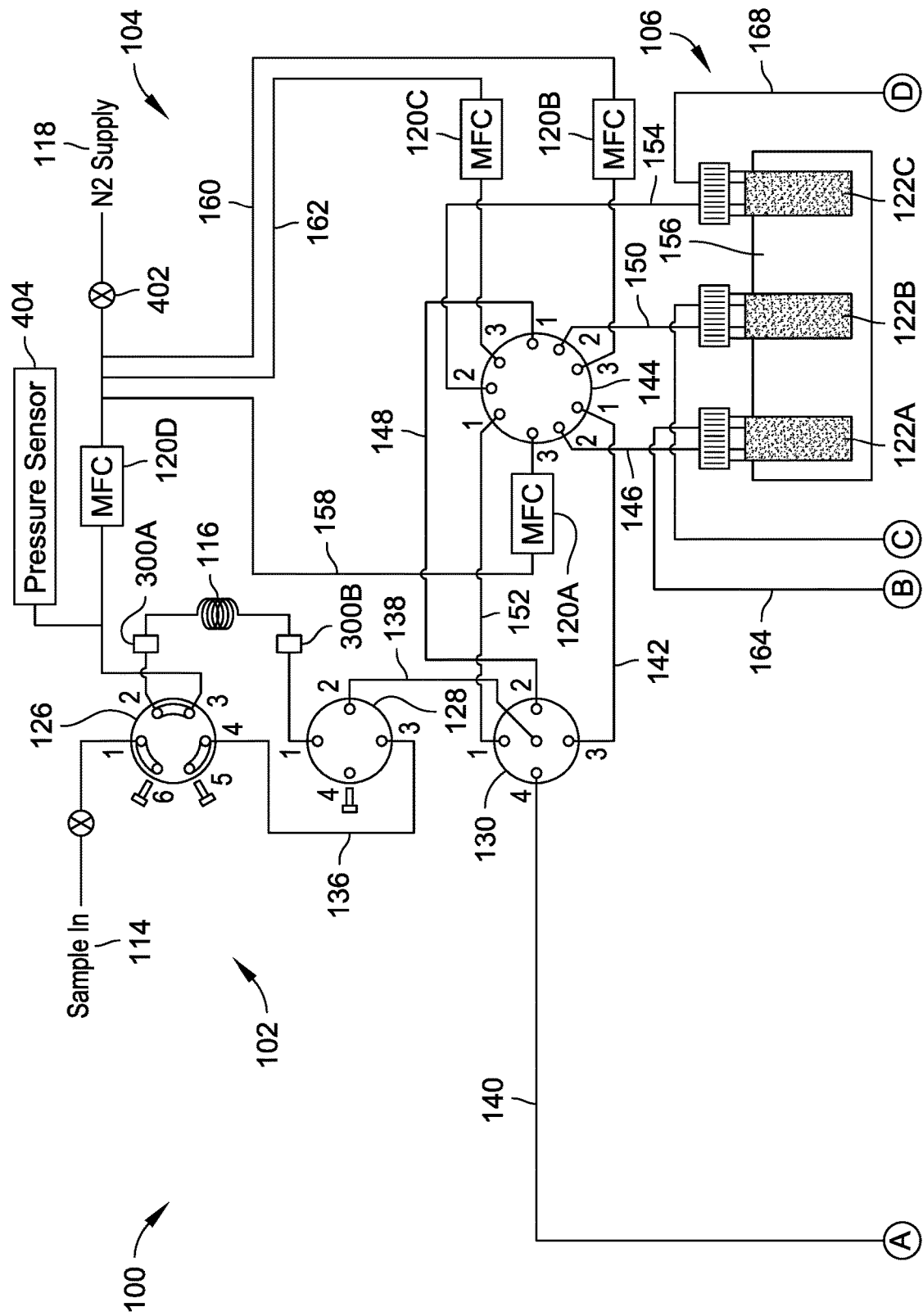
FIGS. 1A and 1B are a schematic illustration of a system for automatic evaporative sample preparation in accordance with example implementations of the present disclosure.
Figure 1B:
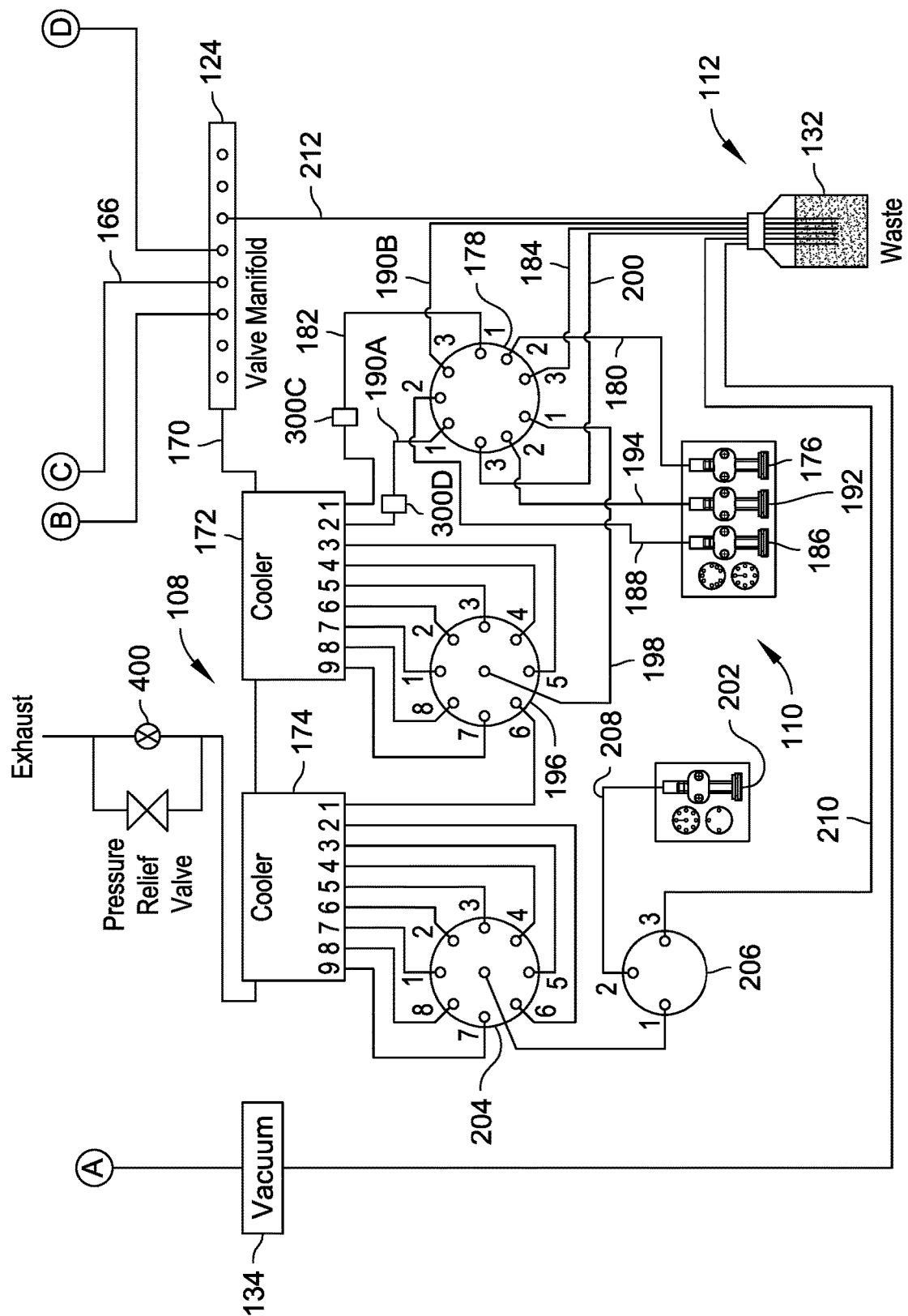

Determination of trace elemental concentrations or amounts in a sample can provide an indication of purity of the sample, or an acceptability of the sample for use as a reagent, reactive component, or the like. For instance, in certain production or manufacturing processes (e.g., mining, metallurgy, semiconductor fabrication, pharmaceutical processing, etc.), the tolerances for impurities or the presence of desirable chemicals can be very strict, for example, on the order of fractions of parts per billion. For certain volatile samples (e.g., volatile organic samples), metallic particles or impurities can be present in liquid which is removed (e.g., evaporated) prior to analysis of the content of the metallic portions. The volatile samples can include toxic or dangerous substances which can pose a threat of exposure to individuals during manual handling and processing of the samples. Further, the vapors provided through evaporation of the samples can pose environmental hazards through exposure to the atmosphere.

Accordingly, the present disclosure is directed, at least in part, to systems and methods for automatic preparation of samples through evaporative sampling for subsequent analysis. Example systems employ pump and valve configurations to automatically transfer fluid samples through the system without exposure to individuals. The systems include enclosed containers for automatic evaporation of liquid portions of the samples, where multiple samples can be automatically evaporated in a simultaneous manner. The vapors produced in the system are collected and transported through a cooling system to condense and collect the condensate for storage without exposure to individuals or the environment external the system. The systems can utilize optical sensors and flow controllers to manage transport of fluids through the system in a controlled and precise manner, such as to ensure precise volumes of sample are transported to the evaporation containers, to ensure consistent application of gas into the evaporation containers to assist in evaporation and carrying vapors to the cooling system, to ensure complete evaporation of all liquid contained in the evaporation containers, and the like.

Example Implementations

FIGS. 1A through 8 illustrate a system 100 for automatic preparation of samples through evaporative sampling in an example implementation. As shown, the system 100 generally includes a sample input portion 102, a gas input portion 104, an evaporation system 106, a cooling system 108, a pump system 110, and a waste portion 112. The sample input portion 102 includes a sample input 114, where the system 100 is configured to receive a fluid sample from a sample source, such as from an autosampler. The sample is directed to a sample loop 116 for holding the sample until the sample is to be directed to the evaporation system 106. While the sample loop 116 is shown including a coiled section of tubing, the sample loop 116 is not limited to coiled configurations and can include other configurations including, but not limited to, serpentine configurations, linear configurations, combinations thereof, or the like. As described herein, the volume of the sample loop 116 influences the amount of sample made available to the evaporation system 106.

The gas input portion 104 includes a gas input 118 to receive a gas into the system 100 from a gas source. In example implementations, the gas includes nitrogen, however the gas is not limited to nitrogen and can include, for example an inert gas or combination of gases. The gas input portion 104 can supply gas to the sample loop 116 (e.g., to push the sample from the sample loop 116, to purge lines of the system 100, to push rinse fluids through the system 100, etc.) and to the evaporation system 106 (e.g., to assist in the evaporation processes, to assist in uptake and transfer of vapor, etc.). In example implementations, the gas input portion 104 includes one or more flow controllers to control the flow rate of gas provided to the evaporation system 106 (e.g., mass flow controllers 120A, 120B, and 120C are shown), to control the flow of sample into the evaporation system 106 (e.g., mass flow controller 120D is shown), or combinations thereof. The evaporation system 106 includes one or more evaporation containers (e.g., evaporation containers 122A, 122B, and 122C are shown) to receive the sample from the sample input portion 102 and to heat the samples within the evaporation containers to vaporize liquid portions of the samples. While three evaporation containers are shown (evaporation containers 122A, 122B, and 122C), the system 100 is not limited to three evaporation containers, and can include fewer than three evaporation containers or more than three evaporation containers, which can be dictated by a desired throughput through the system 100, a number of sample replicates desired, or the like. Vapor produced through the evaporation processes is directed to the cooling system 108 (e.g., via a manifold 124) to condense the vapor for collection into the waste portion 112 (e.g., through operation of the pump system 110). Example operations of the system 100 are described by the following with reference to FIGS. 2A through 8.

Figure 2A:
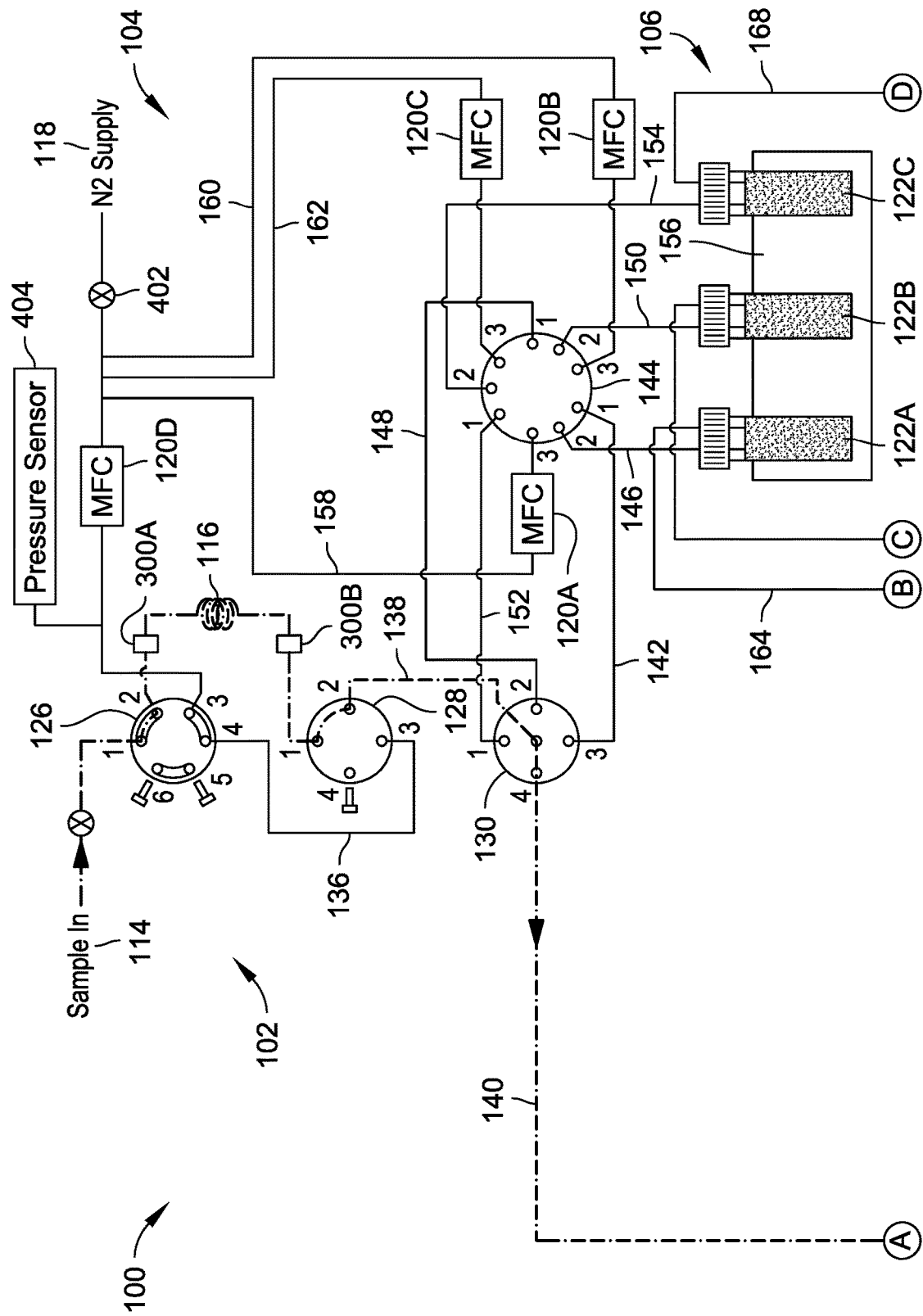
FIGS. 2A and 2B are a schematic illustration of the automatic evaporative sample preparation system of FIGS. 1A and 1B in a flush configuration.
Figure 2B:
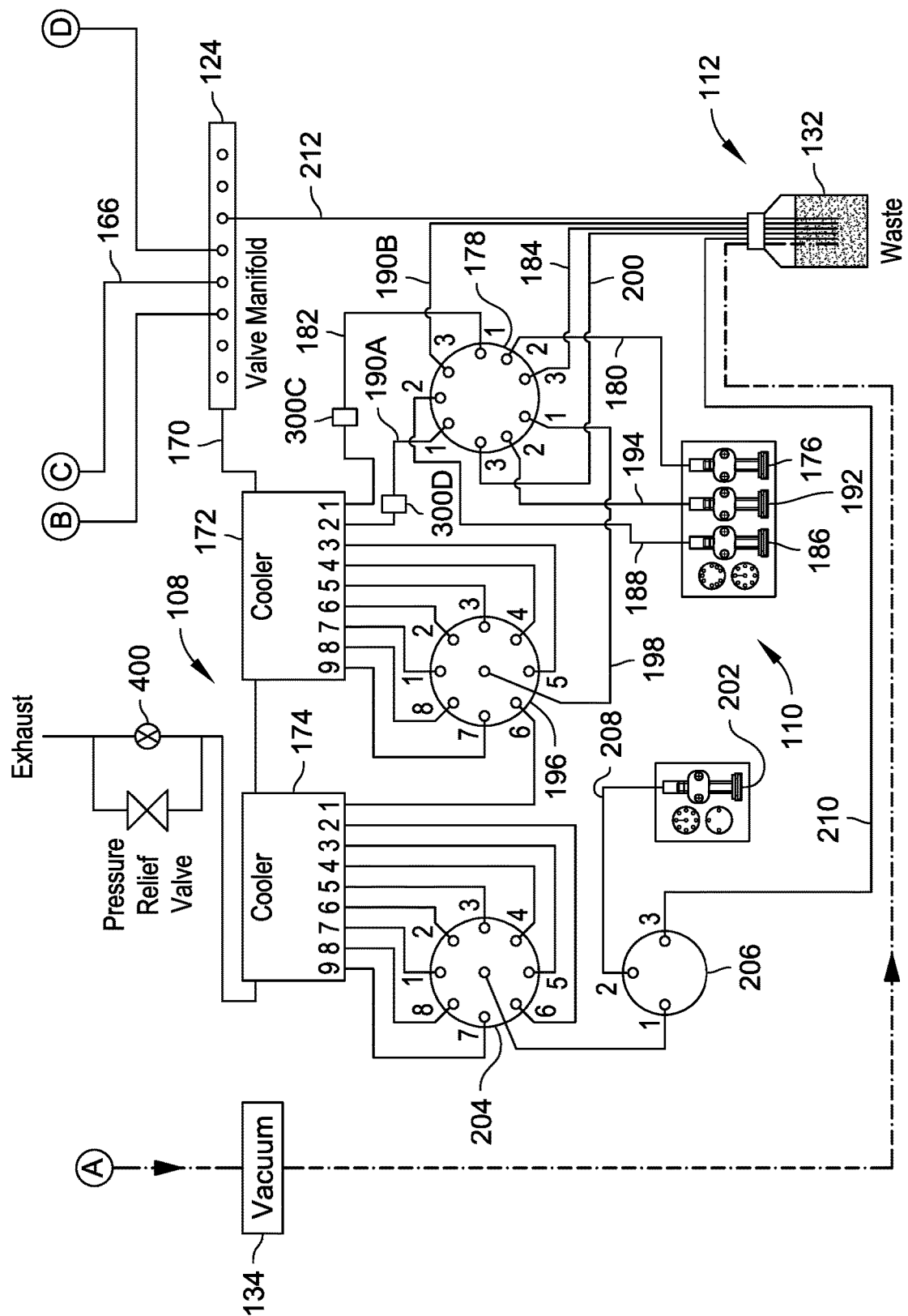

Referring to FIGS. 2A and 2B, the system 100 is shown in a flush configuration in an example implementation, where the sample input portion 102 is flushed with sample to prepare for capturing a sample for evaporation. In the flush configuration, a sample is received from the sample input 114 (e.g., through action from an autosampler or other supply source) and directed into a valve 126 in a first valve configuration fluidically coupled with the sample loop 116 to fill the sample loop 116 and continue to flow to a valve 128 in a first valve configuration and to a valve 130 in a first valve configuration coupled with a fluid line 140. In implementations, the valve 130 is a selection valve including a rotatable channel to couple between a port connected to line 138 and a port to couple to one of lines 140, 142, 152 as described herein to select where fluid received from valve 128 is directed. The sample is then passed through the fluid line 140 and directed to a waste container 132 of the waste portion 112. In implementations, a pump or vacuum source (e.g., vacuum 134 is shown) draws the sample from the sample source to flush the sample input portion 102 of any existing fluids, to fill the sample loop 116 with sample, and to send excess sample to the waste portion 112 via the line 140. In implementations, line 140 has a reduced internal diameter as compared to portions of the sample input portion 102 (e.g., smaller internal diameter than that of the sample loop 116), which can provide a controlled pull of sample through the sample loop 116 (e.g., to avoid introducing bubbles within the sample loop 116 to ensure a precise volume of sample held within the sample loop 116).

Figure 3A:
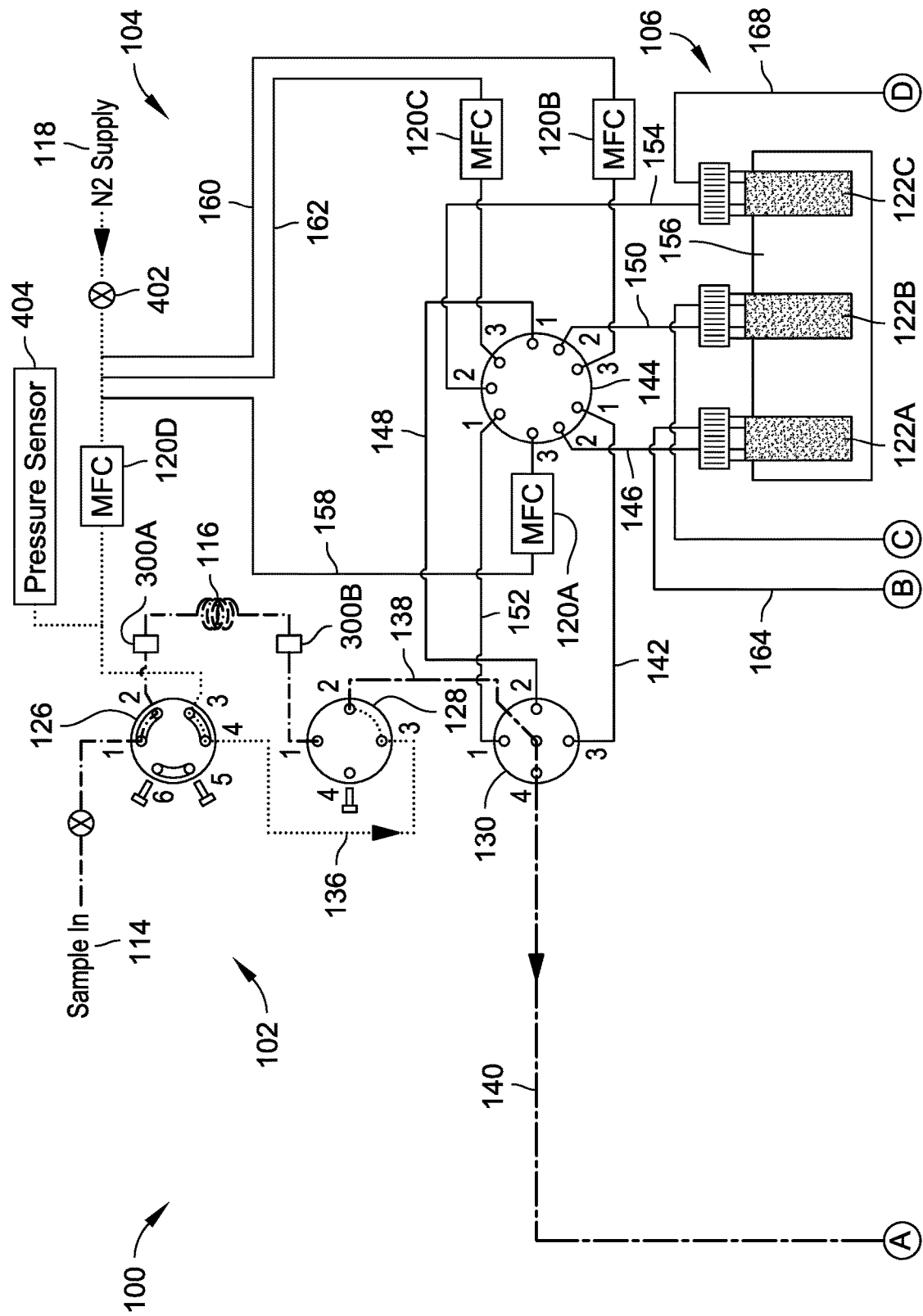
FIGS. 3A and 3B are a schematic illustration of the automatic evaporative sample preparation system of FIGS. 1A and 1B in a purge configuration.
Figure 3B:
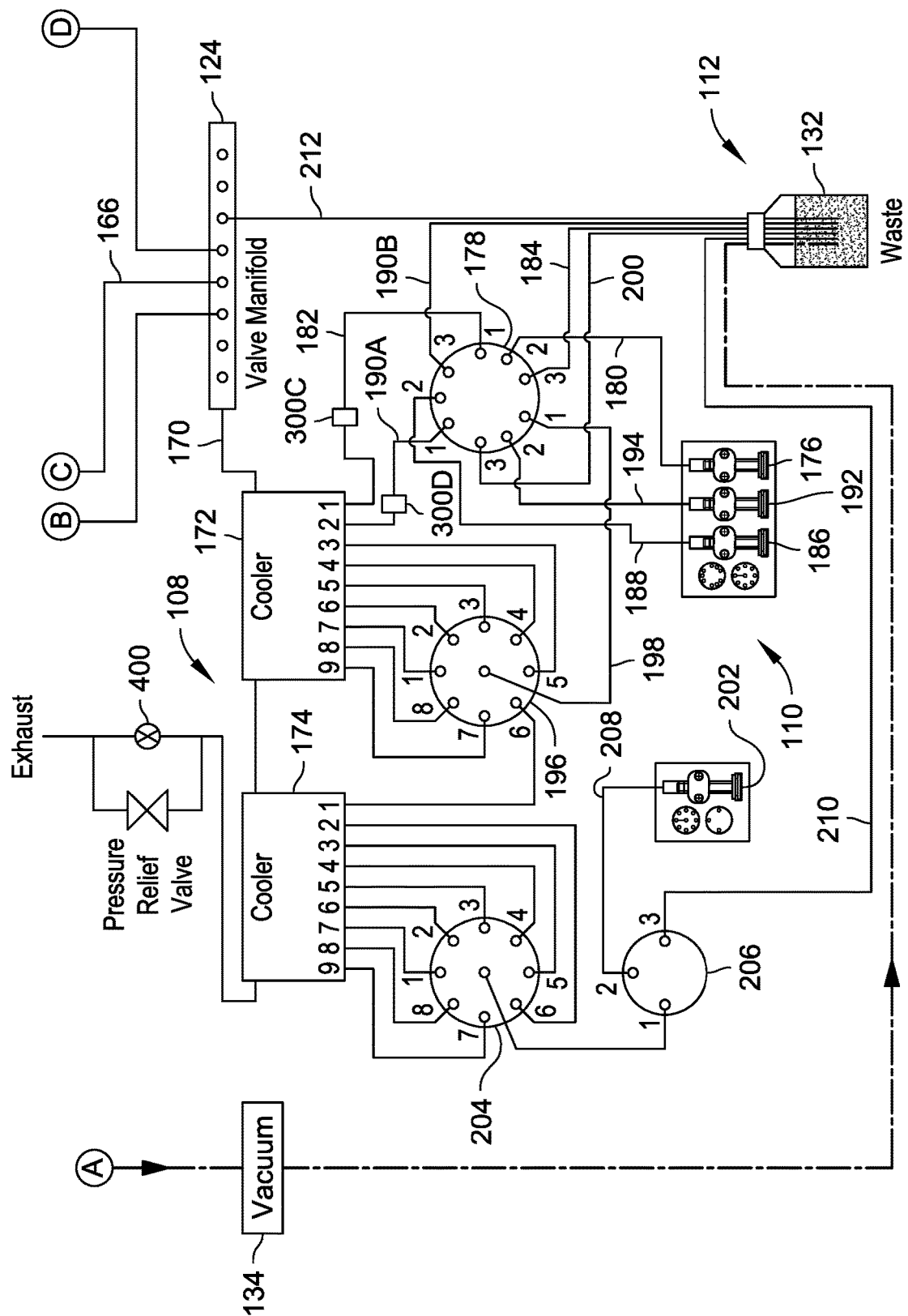

Referring to FIGS. 3A and 3B, the system 100 is shown in a purge configuration, where portions of the sample that are not contained within the sample loop 116 (e.g., portions note contained in the fluidic coupling of the sample loop 116 between the valve 126 and the valve 128) are purged from the sample input portion 102 through action of gas from the gas input portion 104 and directed to the waste container 132. In the purge configuration, the gas input portion 104 receives a gas from the gas input 118 (e.g., nitrogen, inert gas, combination of gases, etc.) and directs the gas to the valve 126 in the first valve configuration and to valve 128 in a second valve configuration to purge sample contained in line 136 between valve 126 and valve 128, which is directed through line 138 to valve 130 in the first valve configuration and out through line 140 to the waste container 132.

Figure 4A:
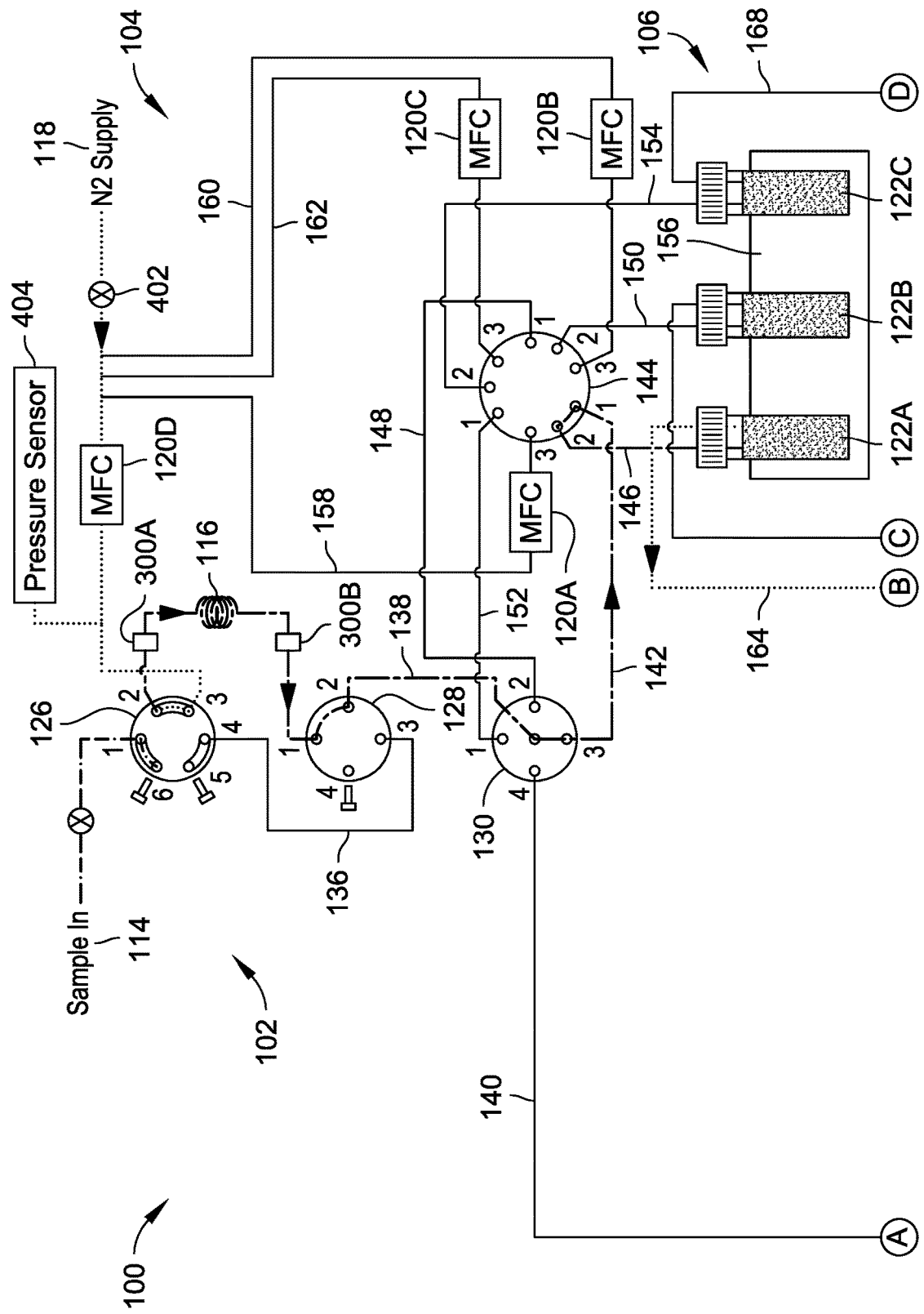
FIGS. 4A and 4B are a schematic illustration of the automatic evaporative sample preparation system of FIGS. 1A and 1B in a evaporation container fill configuration in accordance with example implementations of the present disclosure.
Figure 4B:
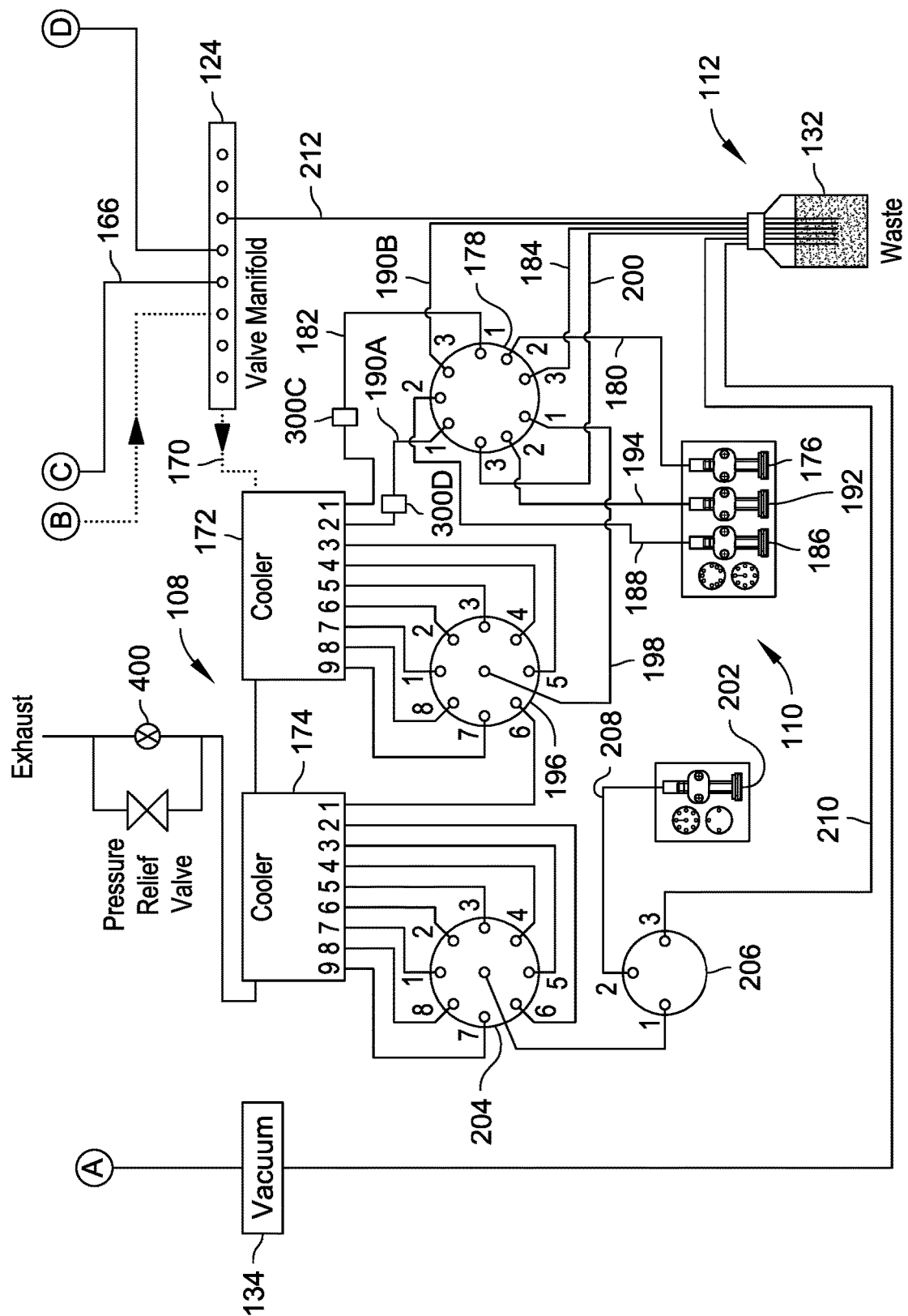
Figure 5A:
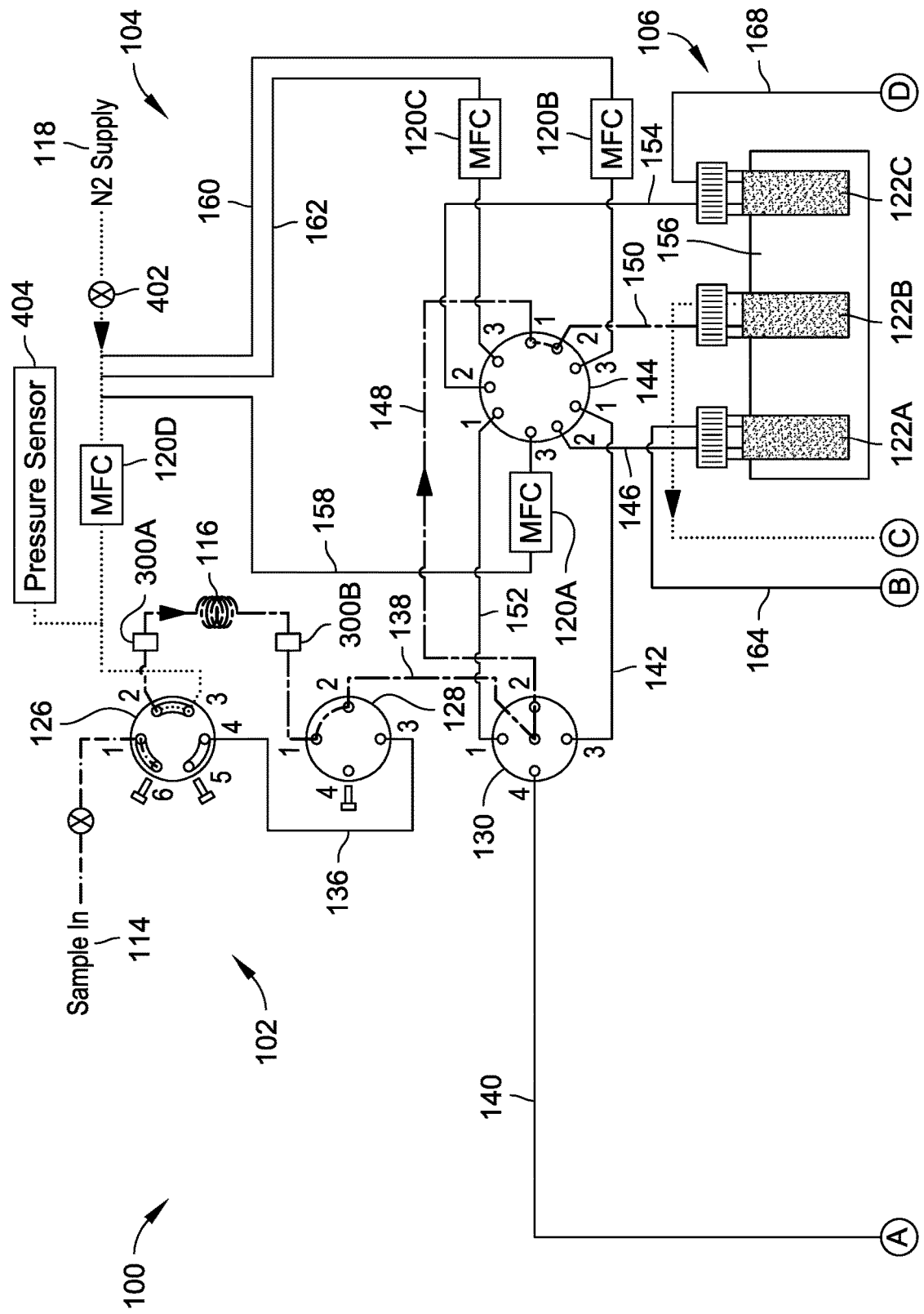
FIGS. 5A and 5B are a schematic illustration of the automatic evaporative sample preparation system of FIGS. 1A and 1B in a evaporation container fill configuration in accordance with example implementations of the present disclosure.
Figure 5B:
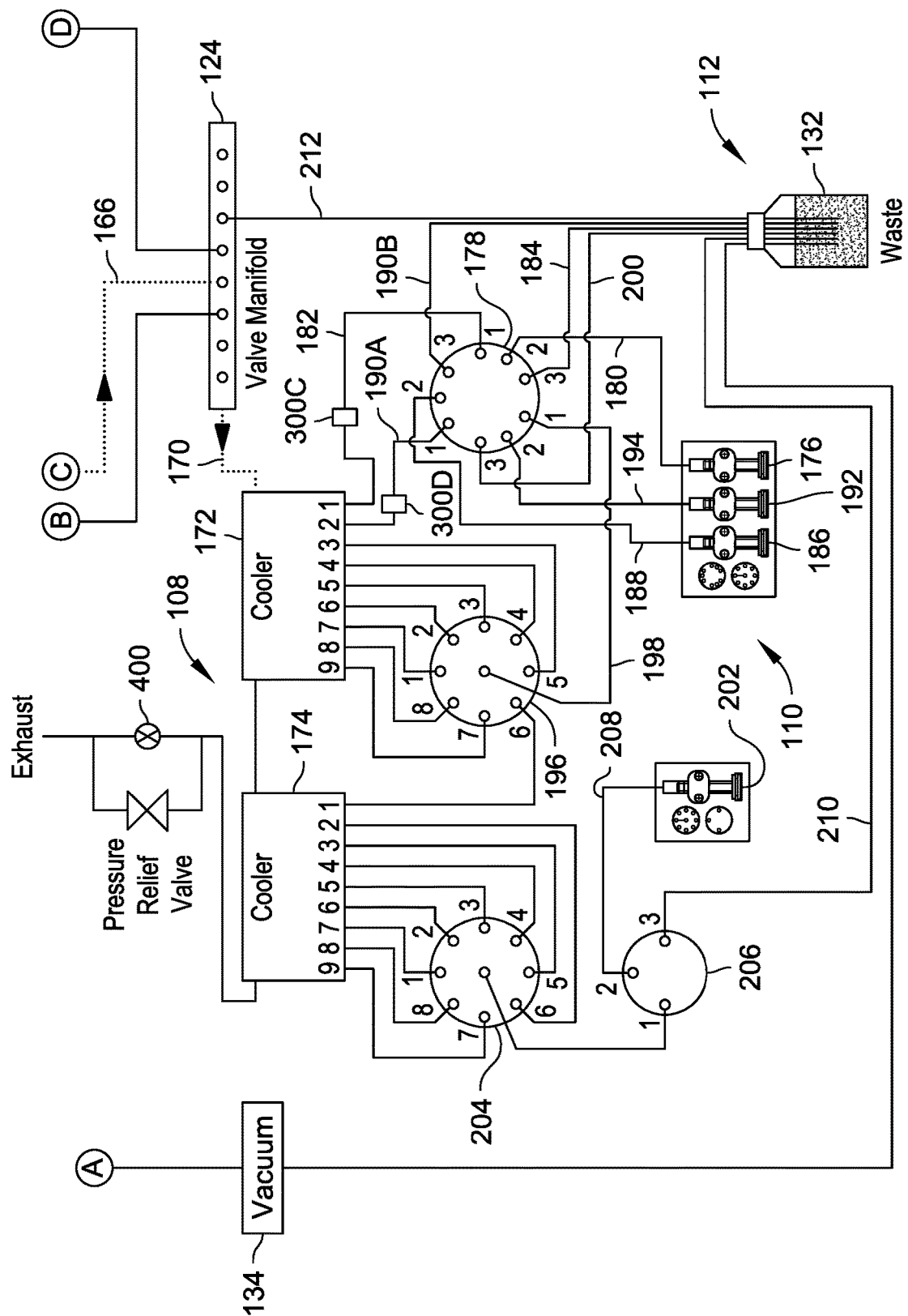
Figure 6A:
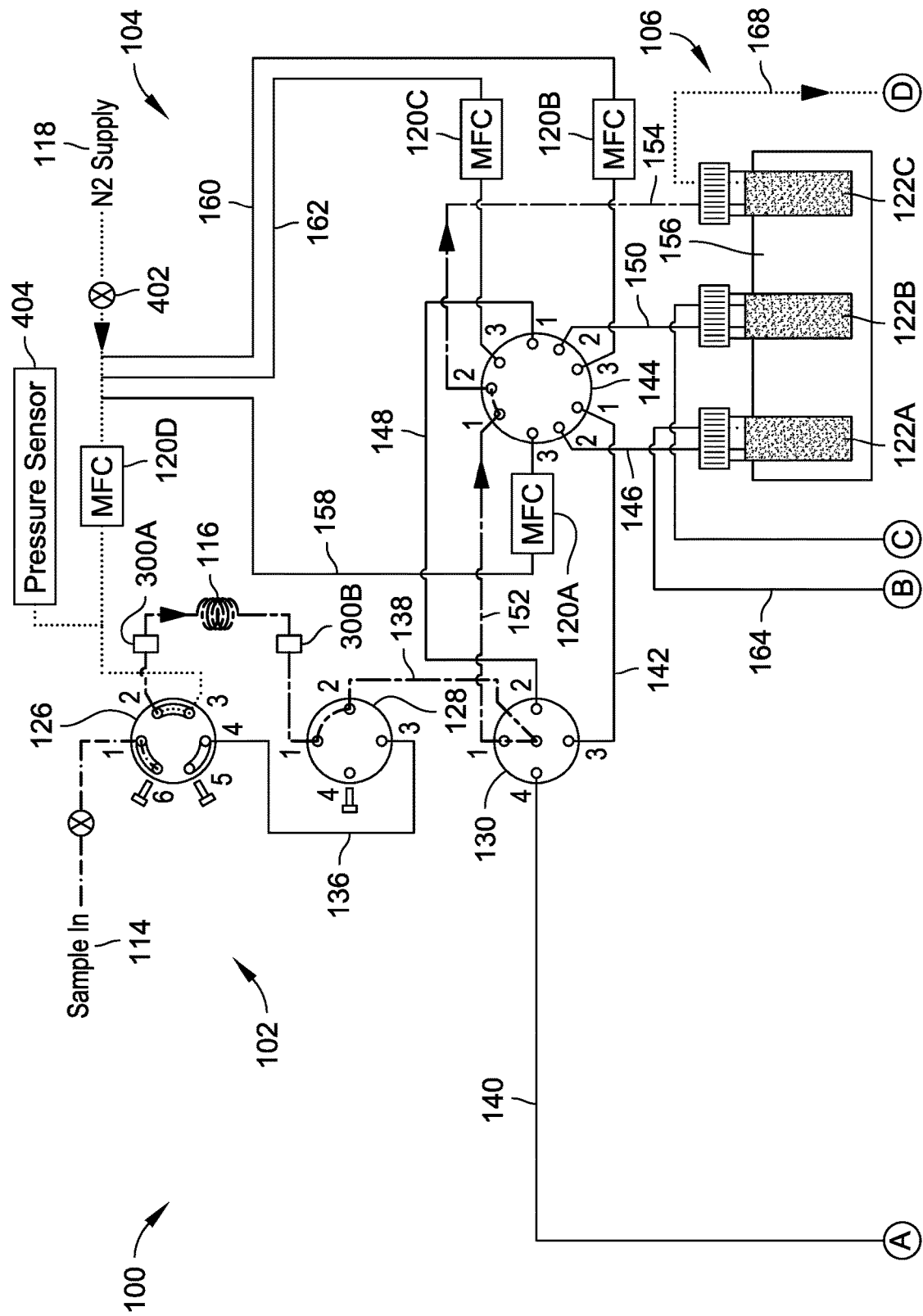
FIGS. 6A and 6B are a schematic illustration of the automatic evaporative sample preparation system of FIGS. 1A and 1B in a evaporation container fill configuration in accordance with example implementations of the present disclosure.
Figure 6B:
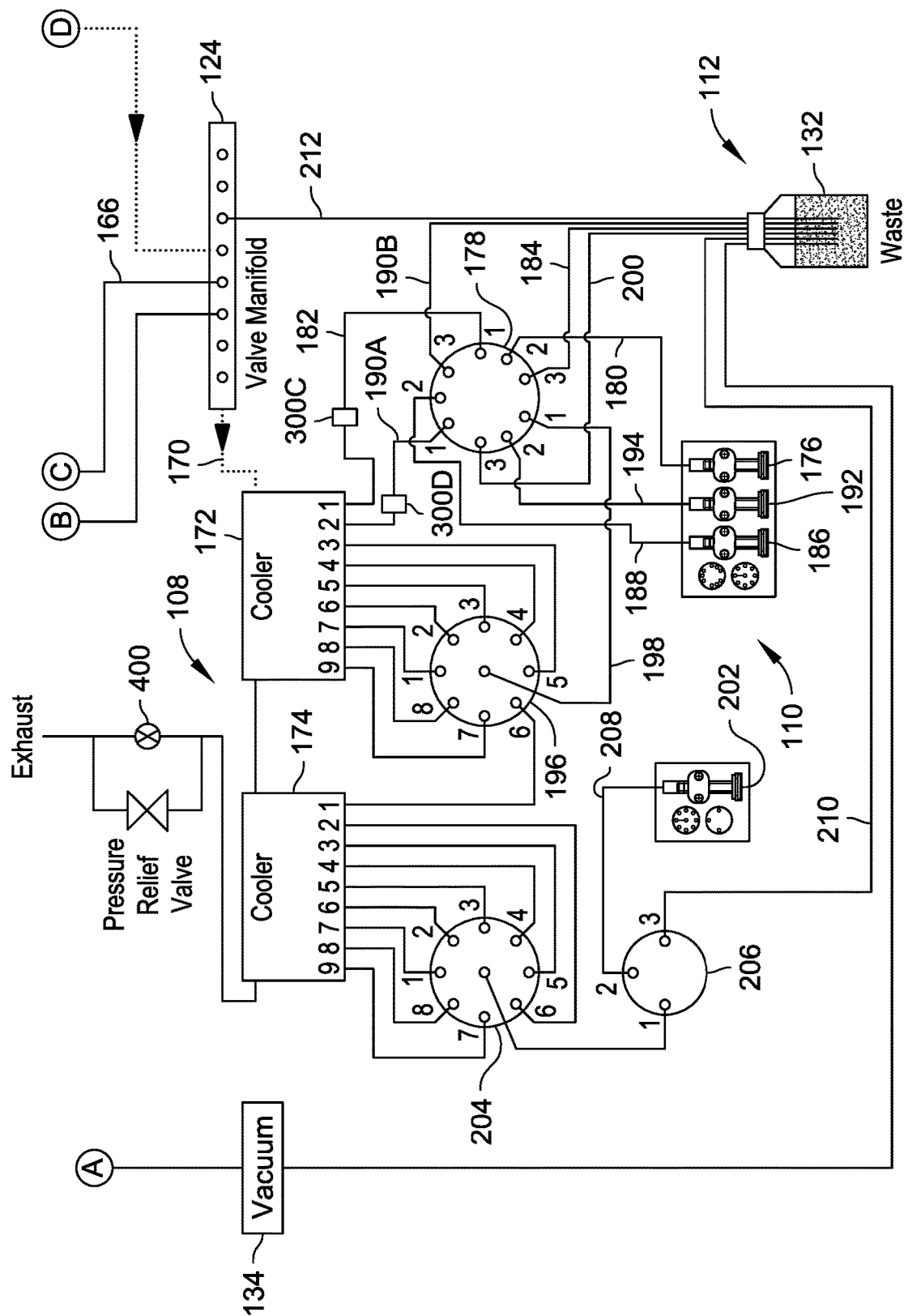

Referring to FIGS. 4A through 6B, the system 100 is shown in a plurality of evaporation container fill configurations in example implementations, where FIGS. 4A and 4B depict an evaporation container fill configuration to fill evaporation container 122A with sample, FIGS. 5A and 5B depict an evaporation container fill configuration to fill evaporation container 122B with sample, and FIGS. 6A and 6B depict an evaporation container fill configuration to fill evaporation container 122C with sample. Referring to FIGS. 4A and 4B, the gas input portion 104 directs gas received from the gas input 118 to the valve 126 in a second valve configuration to push sample contained in the sample loop 116 through valve 128 in the first configuration to line 138 and to valve 130. Valve 130, while in a second valve configuration, directs the sample from line 138 through line 142 to valve 144 in a first configuration which in turn directs the sample into the evaporation container 122A via line 146. Referring to FIGS. 5A and 5B, the gas input portion 104 directs gas received from the gas input 118 to the valve 126 in the second valve configuration to push sample contained in the sample loop 116 through valve 128 in the first configuration to line 138 and to valve 130. Valve 130, while in a third valve configuration, directs the sample from line 138 through line 148 to valve 144 in the first configuration which in turn directs the sample into the evaporation container 122B via line 150. Referring to FIGS. 6A and 6B, the gas input portion 104 directs gas received from the gas input 118 to the valve 126 in the second configuration to push sample contained in the sample loop 116 through valve 128 in the first configuration to line 138 and to valve 130. Valve 130, when in a fourth valve configuration, directs the sample from line 138 through line 152 to valve 144 in the first configuration which in turn directs the sample into the evaporation container 122C via line 154.

The system 100 can revert to the flush configuration and the purge configuration between filling each of the evaporation containers to refill the sample loop 116 and purge portions of the sample that are not contained within the sample loop 116 (e.g., not contained in the fluidic coupling of the sample loop 116 between the valve 126 and the valve 128) through action of gas from the gas input portion 104 and directed to the waste container 132. Since each evaporation container receives sample held in the sample loop 116, the volume of the sample loop 116 dictates the amount of liquid sample available to the evaporation containers such that each container receives approximately the same volume of sample following operation of the system 100 through the flush configuration (e.g., described with reference to FIGS. 2A and 2B), the purge configuration (e.g., described with reference to FIGS. 3A and 3B), and each evaporation container fill configuration (e.g., described with reference to FIGS. 4A through 6B).

Figure 7A:
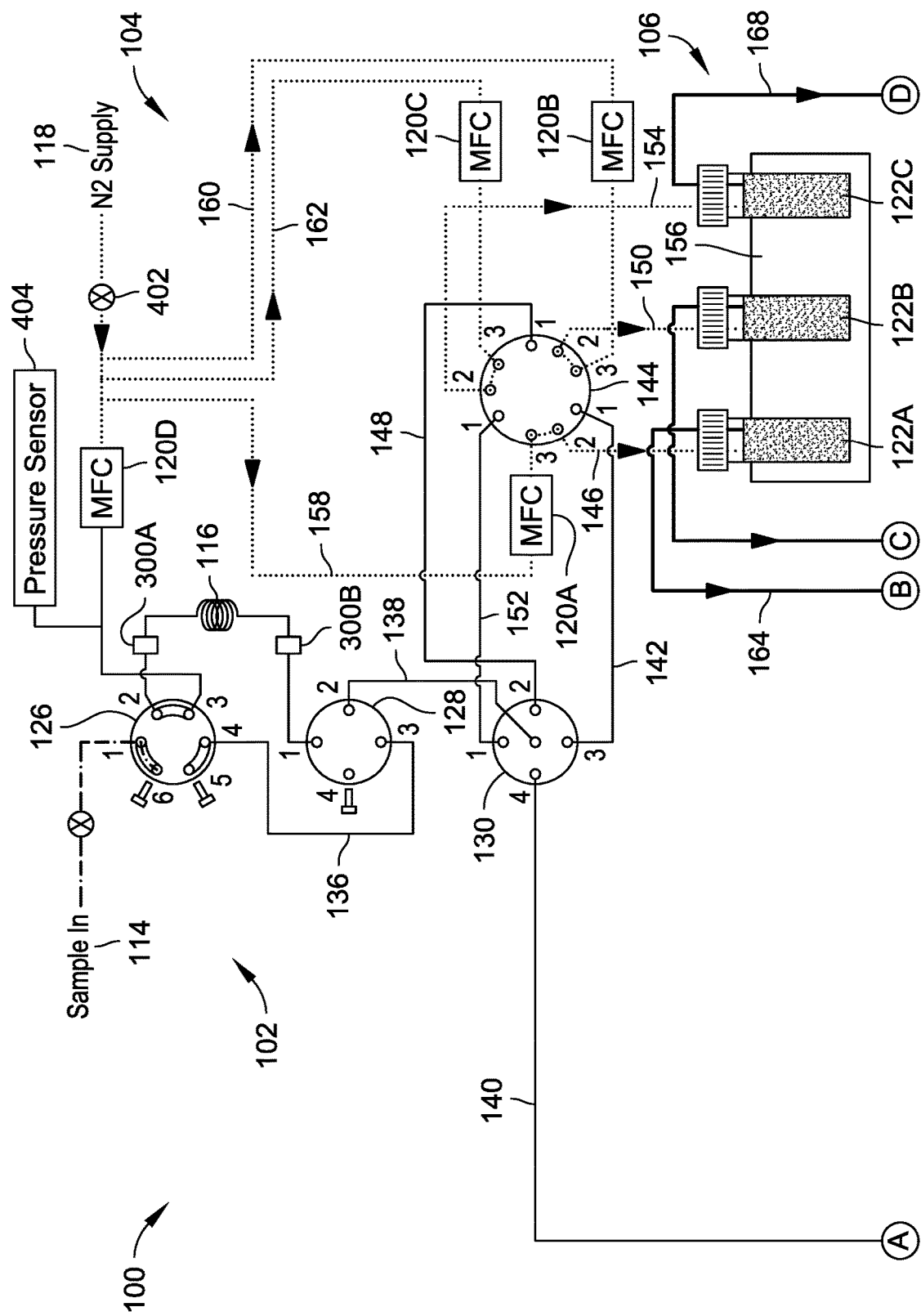
FIGS. 7A and 7B are a schematic illustration of the automatic evaporative sample preparation system of FIGS. 1A and 1B in a sample evaporation configuration.
Figure 7B:
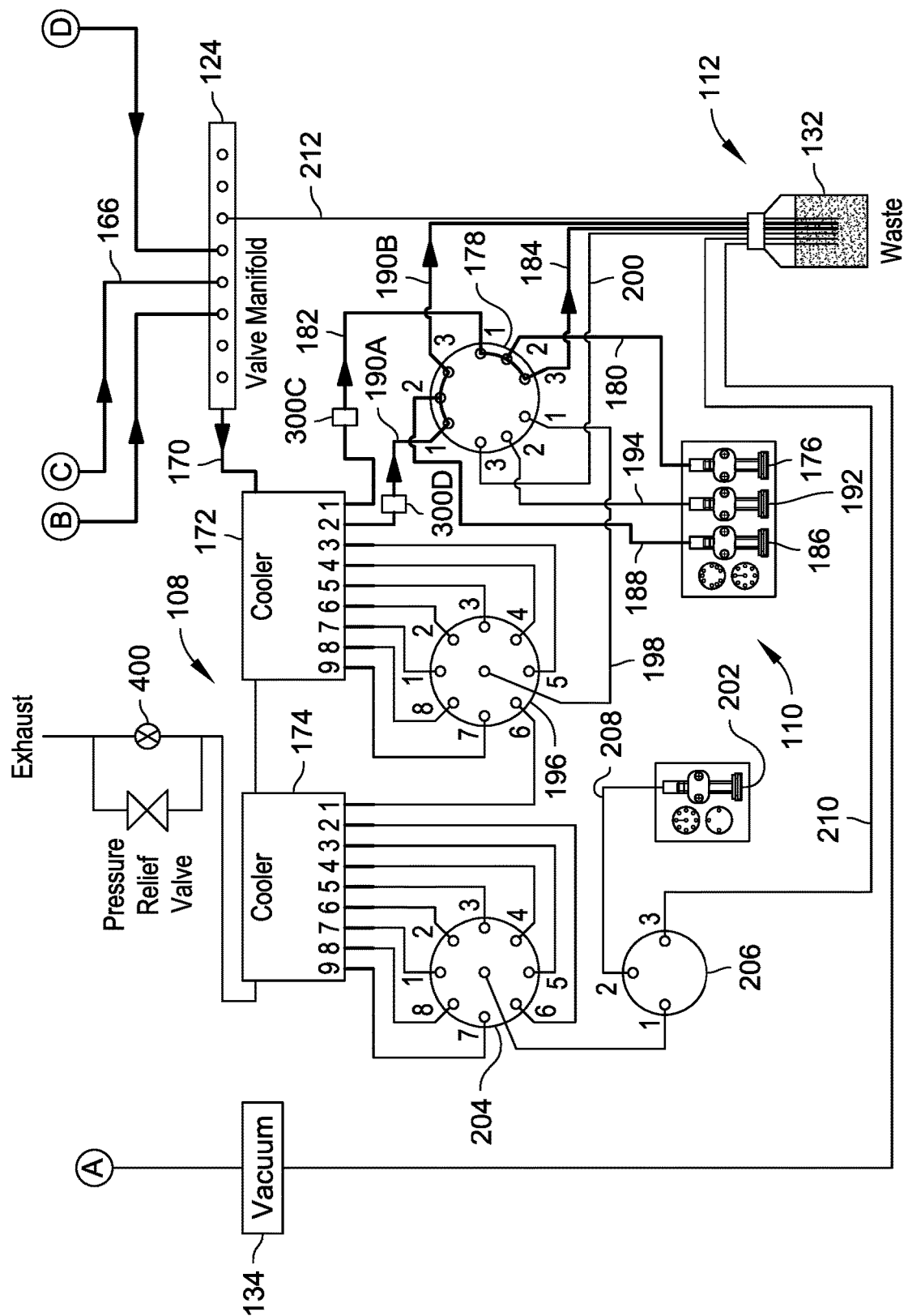

Referring to FIGS. 7A and 7B, the system 100 is shown in a sample evaporation configuration, where the evaporation system 106 evaporates the liquid portion of the samples within the evaporation containers (e.g., evaporation containers 122A, 122B, 122C) and vapor is removed from the evaporation containers. The evaporation system 106 includes a temperature control element 156 coupled to the evaporation containers to facilitate evaporation of the liquid portions of the samples contained within the evaporation containers. The temperature control element 156 can include, but is not limited to, a heating block configured to regulate the temperature of the evaporation containers, such as through conductive heating. For example, the temperature control element 156 can regulate the temperature of the evaporation containers between ambient temperatures and approximately 150° C. to facilitate evaporation of the liquid portion within the evaporation containers. The temperature control element 156 can include a thermal fuse to regulate a maximum temperature before the temperature control element 156 stops functioning. For example, the thermal fuse can be set to a temperature of approximately 175° C. at which point the temperature control element 156 stops heating the evaporation containers, however other temperatures can be utilized depending on the samples to be transferred through the system 100. For instance, the temperature can be a temperature that is below a temperature at which a sample transferred through the system 100 is at risk for ignition, explosion, or the like. In implementations, the temperature control element 156 includes one or more cooling elements to cool the evaporation containers, such as for a safety override of the evaporation system 106. For example, the temperature control element 156 can activate the cooling elements upon reaching the maximum temperature set for the thermal fuse, upon manual entry of a cooling command via a user interface, or combinations thereof.

During evaporation with the system 100 in the sample evaporation configuration, the gas input portion 104 introduces gas from the gas input 118 and directs gas into each of the evaporation containers under individual control of a mass flow controller (e.g., mass flow controllers 120A, 120B, and 120C are shown) to provide substantially equivalent rates of evaporation of samples within the evaporation containers. For example, the gas input portion 104 directs gas under control of mass flow controller 120A through line 158 to valve 144 in a second configuration, which directs the gas through line 146 and into the evaporation container 122A, the gas input portion 104 directs gas under control of mass flow controller 120B through line 160 to valve 144 in the second configuration, which directs the gas through line 150 and into the evaporation container 122B, and the gas input portion 104 directs gas under control of mass flow controller 120C through line 162 to valve 144 in the second configuration, which directs the gas through line 154 and into the evaporation container 122C. Lines 158, 160, and 162 can be coupled to a manifold or other connection structure to distribute gas from the gas input 118 to each of the evaporation containers (e.g., evaporation containers 122A, 122B, 122C) via the valve 144.

Vapor within the evaporation containers is transferred from the evaporation system 106 to the cooling system 108 to condense the vapor for collection and subsequent storage or removal. For example, vapor within the evaporation container 122A exits via line 164 to the manifold 124, vapor within the evaporation container 122B exits via line 166 to the manifold 124, and vapor within the evaporation container 122C exits via line 168 to the manifold 124 for transfer to the cooling system 108 via line 170. In implementations, the inlets and outlets of the evaporation containers include valves to isolate the respective evaporation containers from the system 100 (e.g., for removal, for containment, or the like). Example inlets and outlets of the evaporation containers are described further herein with respect to FIG. 8. The cooling system 108 condenses vapor received from the evaporation system, where the pumping system 110 directs the condensed vapor to the waste container 132. In implementations, the cooling system 108 includes a plurality of cooling stages to direct the vapor through a plurality of cooling paths to ensure substantially complete condensation. For example, the system 100 is shown with two banks of coolers (coolers 172 and 174 are shown), each of which includes a plurality of coils (e.g., nine quartz coils are included in each bank), where the banks include Peltier cooled condenser blocks supporting the coils. As condensate is formed in each of the coils, the condensate is removed through action of the pump system 110, which draws the condensate from each coil through a drain line and subsequently direct to the waste container 132.

In implementations, the first cooling coils condense the vapor into condensate at the greatest rates. As such, the first cooling coil (coil 1 of cooler 172) and the second cooling coil (coil 2 of cooler 172) can each have a dedicated pump to remove condensate from the respective coils for transfer to the waste container 132. For example, the pump system 110 can include a first syringe pump 176 coupled with a valve 178 via line 180 to draw condensate from coil 1 of cooler 172 via line 182 and into line 180 and/or into the body of the syringe pump 176 (e.g., via a drawing motion of the syringe pump 176) and to push the drawn condensate in line 180 to the waste container 132 via line 184 (e.g., when the valve 178 transitions between a first configuration to permit the syringe pump 176 to draw the condensate from the coil and a second configuration to permit the syringe pump 176 to push the condensate to the waste container 132). In implementations, the pump system 110 is configured to alternate between drawing and pushing of the syringes according to a timer or scheduled transition times (e.g., every few seconds switch between drawing and pushing). The pump system 110 can include a second syringe pump 186 coupled with the valve 178 via line 188 to draw condensate from coil 2 of cooler 172 via line 190A and into line 188 (e.g., via a drawing motion of the syringe pump 186) and to push the drawn condensate in line 188 to the waste container 132 via line 190B (e.g., when the valve 178 transitions between a first configuration to permit the syringe pump 176 to draw the condensate from the coil and a second configuration to permit the syringe pump 176 to push the condensate to the waste container 132).

The pump system 110 can include additional pumps to draw condensate from the remaining coils of the coolers 172 and 174. For example, a third syringe pump 192 can draw condensate into line 194, where valve 178 is coupled to a valve 196 to receive condensate from the remainder of coils of cooler 172 (e.g., coils 3-9; and optionally certain coils of cooler 174) which are directed to a mixing port or a selection port of the valve 196 and transferred to valve 178 via line 198, where the third syringe pump 192 pushes the condensate to the waste container via line 200. As another example, a fourth syringe pump 202 is shown coupled to a valve 204 via valve 206 to receive into line 208 condensate received from the coils of cooler 174 (e.g., coils 2-9 are shown coupled to valve 204), where the where the fourth syringe pump 202 pushes the condensate to the waste container via line 210 (e.g., upon transitioning of valve 206 from a first configuration to permit fluid communication between the valve 204 and the fourth syringe 202 to a second configuration to permit fluid communication between the waste container 132 and the fourth syringe 202). In implementations, the cooling system 108 includes a single condensate outlet to draw condensate collected from one or more cooling coils or coolers. The waste portion 112 can also include a recirculation line 212 coupled between the waste container 132 and the manifold 124 to direct vapor from the waste container 132 back into the cooling system 108 via line 170 for condensing back to the waste container 132.

In implementations, the system 100 utilizes sensors to track the flow of fluids through the system 100. For example, optical sensors 300A, 300B, 300C, and 300D are shown and can detect whether liquid or gas is traveling through the respective fluid lines to which the sensors are attached. For instance, optical sensors 300A and 300B are positioned on the sample loop 116 lines at opposing sides (e.g., optical sensor 300A adjacent valve 126 and optical sensor 300B adjacent valve 128) to ensure a sufficient amount of sample is located within the sample loop 116 with a complete fill of the sample loop 116 (e.g., with substantially no bubbles present). The optical sensor 300B can sense when sample is received from the sample input 114 during filling of the sample loop 116, and monitors to ensure no bubbles have been detected for a certain time period (e.g., a period of time equating a full fill of the sample loop 116, based on flow rate of sample from the sample input 114 and the volume of the sample loop 116). The optical sensor 300A can monitor for bubbles in the line to ensure that the sample from the sample input 114 has not run out before filling the entire sample loop 116. For instance, bubbles detected by the optical sensor 300A before the time period expected for a complete fill of the sample loop 116 has elapsed can indicate that insufficient sample is introduced to the sample loop 116. Optical sensors 300C and 300D can be positioned on lines 182 and 190A, respectively, to determine whether any additional condensate is being drawn from the coils of cooler 172 (e.g., coils 1 and 2, respectively). The pump system 110 can transition between drawing condensate from the coolers 172 and 174 and pushing condensate to the waste container 132, and as such, the lines 182 and 190A may have intermittent periods of bubbles or liquid depending on the particular configuration of the valve 178. To account, the output of the optical sensors 300C and 300D can be reviewed during periods of drawing the condensate from the cooler 172 to determine whether liquid is flowing through lines 182 and 190A. When bubbles are detected during periods of drawing the condensate, the system 100 can determine that the evaporation of samples in the evaporation containers is substantially completed (or in certain circumstances, that there is a fault in the system, such as a heater malfunction).

In implementations, the system 100 can perform a leak check to determine whether any leaks are present in the lines, valves, evaporation containers, or other portions of the system 100. For example, the system can include a valve 400 adjacent an exhaust from the system 100 coupled with the cooling system 108 and can include a valve 402 adjacent the gas input 118. During a leak check configuration, the system 100 can close valve 400, introduce gas from the gas input 118 to fill the lines, valves, evaporation containers, or other portions of the system 100, and then close the valve 402 to contain all the gas within the system 100. The system 100 can make a first determination of pressure within the system 100 through a pressure sensor 404 at a first time following closing valve 402, and then can make a second determination of pressure within the system 100 at a second time to determine whether a loss in pressure is detected, which can signal a leak within the system 100. The time period between the first time and the second time can be a user configurable time period. While the pressure sensor 404 is shown coupled prior to and upstream from the valve 126, the pressure sensor 404 can be coupled to any portion of the system 100 to provide the leak check or other pressure measurement.

Referring to FIG. 8, evaporation containers are shown in accordance with example implementations. For example, evaporation containers 122A, 122B, and 122C are shown, each having a container body 600A, 600B, 600C to contain the sample received from the sample input 114 and a container cap 602A, 602B, 602C to seal the interiors of the container bodies from the surrounding environment. The inlet lines (e.g., lines 146, 150, 154) that transport sample and gas into the evaporation containers pass through the container caps. In implementations, the inlet lines pass completely through the container caps and descend into the container body beneath the caps for a distance, which can facilitate introduction of the sample and gas into the container bodies while avoiding contaminating the caps with liquid. Further, the outlet lines (e.g., lines 164, 166, 168) that transport vapor from the evaporation containers pass through the container caps can similarly descend beneath the caps for a distance, which can assist with vapor uptake of dense vapor. In implementations, the container caps 602A, 602B, 602C include nebulizer couplings 604A, 604B, 604C to introduce a nebulized fluid to the container bodies 600A, 600B, 600C following completion of the evaporation of liquid sample within the evaporation containers 122A, 122B, and 122C to prepare any residual solids for sample analysis.

The system 100 is configured to automatically manage evaporative sample preparation through operation of valves, pumps, mass flow controllers, or other components of the system 100. For example, the system 100 can include a computing device including a processor and a computer memory. The processor provides processing functionality for the computing device and may include any number of processors, micro-controllers, or other processing systems, and resident or external memory for storing data and other information accessed or generated by the computing device. The processor may execute one or more software programs that implement the techniques and system configurations described herein. The processor is not limited by the materials from which it is formed or the processing mechanisms employed therein and, as such, may be implemented via semiconductor(s) and/or transistors (e.g., electronic integrated circuits (ICs)), and so forth.

The memory is an example of device-readable storage media that provides storage functionality to store various data associated with the operation of the computing device, such as the software program and code segments mentioned above, or other data to instruct the processor and other elements of the computing device to perform the techniques described herein. A wide variety of types and combinations of memory may be employed. The memory may be integral with the processor, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the computing device, the memory may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing device includes a display to display information to a user of the computing device. In embodiments, the display may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display may be backlit via a backlight such that it may be viewed in the dark or other low-light environments. The display may be provided with a touch screen to receive input (e.g., data, commands, etc.) from a user. For example, a user may operate the computing device by touching the touch screen and/or by performing gestures on the touch screen. In some embodiments, the touch screen may be a capacitive touch screen, a resistive touch screen, an infrared touch screen, combinations thereof, and the like. The computing device may further include one or more input/output (I/O) devices (e.g., a keypad, buttons, a wireless input device, a thumbwheel input device, a trackstick input device, and so on). The I/O devices may include one or more audio I/O devices, such as a microphone, speakers, and so on.

The computing system may also include a communication interface to transfer of data or control instructions between different devices (e.g., components/peripherals) and/or over the one or more networks. The communication module may be representative of a variety of communication components and functionality including, but not necessarily limited to: a browser; a transmitter and/or receiver; data ports; software interfaces and drivers; networking interfaces; data processing components; and so forth.

The one or more networks are representative of a variety of different communication pathways and network connections which may be employed, individually or in combinations, to communicate among the components of the automatic sampling and digestion environment. Thus, the one or more networks may be representative of communication pathways achieved using a single network or multiple networks. Further, the one or more networks are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth. Examples of wireless networks include, but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing device can include a user interface, which is storable in memory and executable by the processor. For example, the user interface may provide functionality to control the display of information and data to the user of the computing device via the display. In some implementations, the display may not be integrated into the computing device and may instead be connected externally using universal serial bus (USB), Ethernet, serial connections, and so forth. The user interface may provide functionality to allow the user to interact with one or more applications of the computing device by providing inputs (e.g., sample identities, fluid flow rates, evaporation container volumes, evaporation temperatures, cooling temperatures, syringe pump timing, valve timing, etc.) via the touch screen and/or the I/O devices. For example, the user interface may cause an application programming interface (API) to be generated to expose functionality to an evaporative sample preparation controller to allow the user to interact with an application by providing inputs via the touch screen and/or the I/O devices to provide desired evaporation conditions or sample preparation and subsequent analysis.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
    a sample input portion configured to receive a fluid sample from a sample source, the sample input portion including a sample loop to hold the fluid sample;
    a plurality of evaporation containers, each evaporation container fluidically coupled with each of the sample loop and a valve, each evaporation container including a fluid input line and a vapor output line and a body fluidically coupled to each of the fluid input line and the vapor output line, each evaporation container configured to receive the fluid sample into the body through the fluid input line when the valve is in a first valve configuration;
a temperature control element operably coupled with at least one evaporation container to control a temperature of the body of the at least one evaporation container to vaporize at least a portion of the fluid sample, at least one evaporation container fluidically coupled with a gas input when the valve is in a second valve configuration to receive a gas from the gas input through the fluid input line to transport vapor out of the evaporation container via the vapor output line; and
a cooling system fluidically coupled with the vapor output line, the cooling system including at least one cooling element configured to receive the vapor from at least one evaporation container and to condense the vapor into liquid.

2. The system of claim 1, further comprising a manifold coupled to the vapor output line of each evaporation container of the plurality of evaporation containers, the manifold including an outlet coupled with cooling system to fluidically couple the cooling system with each vapor output line.

3. The system of claim 1, further comprising:
a selection valve fluidically coupled between the sample input portion and the valve, the selection valve having a first valve configuration that fluidically connects the sample loop with a first evaporation container of the plurality of evaporation containers but not a second evaporation container of the plurality of evaporation containers, the selection valve having a second valve configuration that that fluidically connects the sample loop with the second evaporation container of the plurality of evaporation containers but not the first evaporation container of the plurality of evaporation containers.

4. The system of claim 3, further comprising a waste container, wherein the selection valve has a third valve configuration that fluidically connects the sample loop with the waste container.

5. The system of claim 1, further comprising:
a mass flow controller coupled between the gas input and the valve to regulate the flow of gas from the gas input to at least one evaporation container.

6. The system of claim 1, wherein the sample loop is fluidically coupled to the gas input via a second valve when the second valve is in a first valve configuration to introduce the fluid sample to at least one evaporation container when the valve is in the first valve configuration, and wherein the sample loop is not fluidically coupled to the gas input when the second valve is in a second valve configuration.

7. The system of claim 6, further comprising:
a mass flow controller coupled between the gas input and the second valve to regulate the flow of gas from the gas input to the sample loop when the second valve is in the first valve configuration.

8. The system of claim 1, wherein at least one evaporation container further includes a cap coupled to the body to isolate an interior of the body from an external environment, wherein each of the fluid input line and the vapor output line is coupled to the cap.

9. The system of claim 8, wherein the fluid input line extends into the interior of the body beyond the cap.

10. The system of claim 1, further comprising:
an optical sensor coupled to the sample loop to detect presence or absence of a bubble during fluid flow through the sample loop.

11. The system of claim 1, further comprising:
a first optical sensor positioned at a first end of the sample loop to detect presence or absence of a bubble entering the sample loop during fluid flow through the sample loop; and
a second optical sensor positioned at a second end of the sample loop distal the first end to detect presence or absence of the bubble leaving the sample loop during fluid flow through the sample loop.

12. The system of claim 1, further comprising:
a pump system fluidically coupled with the cooling system to remove condensed liquid from the cooling system.

13. The system of claim 12, further comprising
at least one bubble sensor coupled between the cooling system and the pump system to detect presence or absence of a bubble leaving the cooling system.

14. A system comprising:
a sample input portion configured to receive a fluid sample from a sample source, the sample input portion including a sample loop to hold the fluid sample;
a first evaporation container and a second evaporation container each fluidically coupled with the sample loop and a valve, the first evaporation container including a first fluid input line and a first vapor output line and a first body fluidically coupled to each of the first fluid input line and the first vapor output line, the second evaporation container including a second fluid input line and a second vapor output line and a second body fluidically coupled to each of the second fluid input line and the second vapor output line;
a selection valve fluidically coupled between the sample input portion and the valve, the selection valve having a first valve configuration that fluidically connects the sample loop with the first evaporation container but not the second evaporation container to introduce the fluid sample to the first evaporation container when the valve is in a first valve configuration, the selection valve having a second valve configuration that that fluidically connects the sample loop with the second evaporation container but not the first evaporation container to introduce the fluid sample to the second evaporation container when the valve is in the first valve configuration;
a temperature control element operably coupled with each of the first evaporation container and the second evaporation container to control a temperature of the first body and the second body, the temperature control element configured to vaporize at least a portion of the fluid sample within the first body and the second body,
a gas input fluidically coupled to each of the first fluid line and the second fluid line with the valve is in a second valve configuration to transport vapor out of the first evaporation container via the first vapor output line and out of the second evaporation container via the second vapor output line; and
a cooling system fluidically coupled with each of the first vapor output line and the second vapor output line, the cooling system including at least one cooling element configured to receive the vapor from the first evaporation container and the second evaporation container and to condense the vapor into liquid.

15. The system of claim 14, further comprising:
a mass flow controller coupled between the gas input and the valve to regulate the flow of gas from the gas input to the first evaporation container.

16. The system of claim 14, wherein the sample loop is fluidically coupled to the gas input via a second valve when the second valve is in a first valve configuration to introduce the fluid sample to one of the first evaporation container or the second evaporation container when the valve is in the first valve configuration, and wherein the sample loop is not fluidically coupled to the gas input when the second valve is in a second valve configuration.

17. The system of claim 14, further comprising:
an optical sensor coupled to the sample loop to detect presence or absence of a bubble during fluid flow through the sample loop.

18. The system of claim 14, further comprising:
a pump system fluidically coupled with the cooling system to remove condensed liquid from the cooling system.

19. The system of claim 18, further comprising a waste container fluidically coupled with the pump system to receive the condensed liquid from the pump system.

* * * * *